United States Patent
Largy

(10) Patent No.: US 12,101,049 B2
(45) Date of Patent: Sep. 24, 2024

(54) ELECTRIC MOTORIZATION SYSTEM WITH A PREHEATING FUNCTION FOR PROTECTING THE MOTOR THEREOF AGAINST THE CONDENSATION

(71) Applicant: MANITOWOC CRANE GROUP FRANCE, Dardilly (FR)

(72) Inventor: Frédéric Largy, Saint Georges sur Renon (FR)

(73) Assignee: MANITOWOC CRANE GROUP FRANCE, Dardilly (FR)

( * ) Notice: Subject to any disclaimer, the term of this patent is extended or adjusted under 35 U.S.C. 154(b) by 184 days.

(21) Appl. No.: 17/135,357

(22) Filed: Dec. 28, 2020

(65) Prior Publication Data
US 2021/0203267 A1 Jul. 1, 2021

(30) Foreign Application Priority Data
Dec. 27, 2019 (FR) .................................. 1915655

(51) Int. Cl.
*H02P 29/62* (2016.01)
*B66C 13/12* (2006.01)
(Continued)

(52) U.S. Cl.
CPC .............. *H02P 29/62* (2016.02); *B66C 13/22* (2013.01); *B66C 23/022* (2013.01)

(58) Field of Classification Search
CPC ........ H02P 29/62; B66C 13/22; B66C 23/022
(Continued)

(56) References Cited

U.S. PATENT DOCUMENTS 3,582,712 A * 6/1971 Blair ........................ H02H 7/08
318/473
5,896,021 A * 4/1999 Kumar .................... H02P 29/62
318/471
(Continued)

FOREIGN PATENT DOCUMENTS

CN 103539024 A * 1/2014
FR 1191952 A 10/1959
(Continued)

OTHER PUBLICATIONS

European Search Report dated Apr. 26, 2021 issued in connection with corresponding EP Pat. Appl. No. 20 21 6500.
(Continued)

*Primary Examiner* — Jorge L Carrasquillo
(74) *Attorney, Agent, or Firm* — Cook Alex Ltd.

(57) ABSTRACT

An electric motorization system includes a motorized unit equipped with a motor provided with a rotor and stator assembly including several coils, and a frequency converter which is electrically powered by a power supply. The frequency converter is controlled by a monitoring/control unit for turning on the motor in a variable speed operating mode, or for turning off the motor. The electric motorization also includes a measurement system suitable for measuring at least one condensation parameter which is representative of a condensation of the water contained in an ambient air, and the monitoring/control unit is configured to, depending on said condensation parameter, control the frequency converter during the turning off of the motor so that a preheating electric current flows through the coils to activate a preheating of the motor when it is turned off.

12 Claims, 1 Drawing Sheet

(51) Int. Cl.
  *B66C 13/16*    (2006.01)
  *B66C 13/22*    (2006.01)
  *B66C 23/02*    (2006.01)

(58) Field of Classification Search
  USPC ........................................................ 318/483
  See application file for complete search history.

(56) References Cited

U.S. PATENT DOCUMENTS 8,235,230 B2 *  8/2012  Juraszek ................. B66C 23/84
                                                    212/278
2017/0214346 A1    7/2017  Priem

FOREIGN PATENT DOCUMENTS

FR         1544012  A       10/1968
KR   1020170025832  A   *    3/2017
WO      2014/006368  A2       1/2014

OTHER PUBLICATIONS

FR search report issued in connection with corresponding FR patent application 1915655, dated Sep. 9, 2020.
English translation of FR search report issued in connection with corresponding FR patent application 1915655, dated Sep. 9, 2020. (2 pages).

* cited by examiner

[Fig 1]
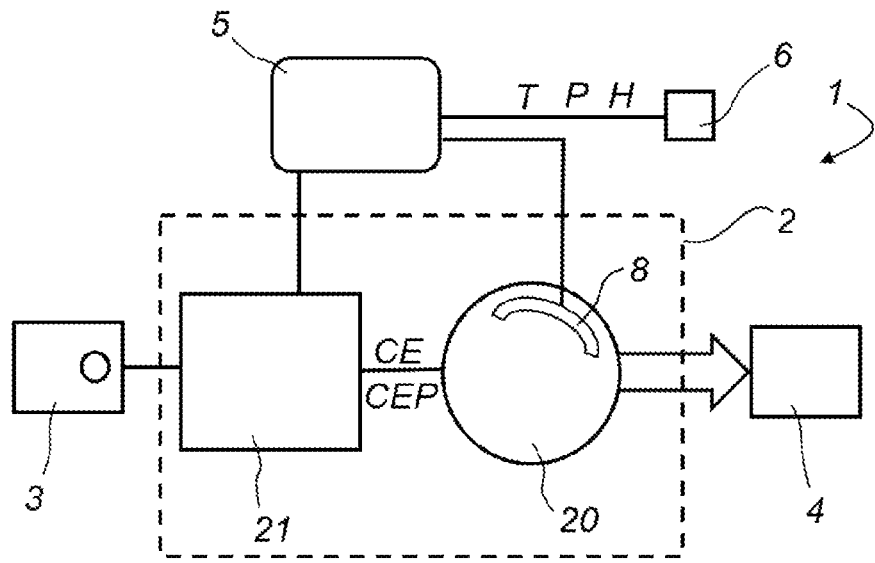
[Fig 2]
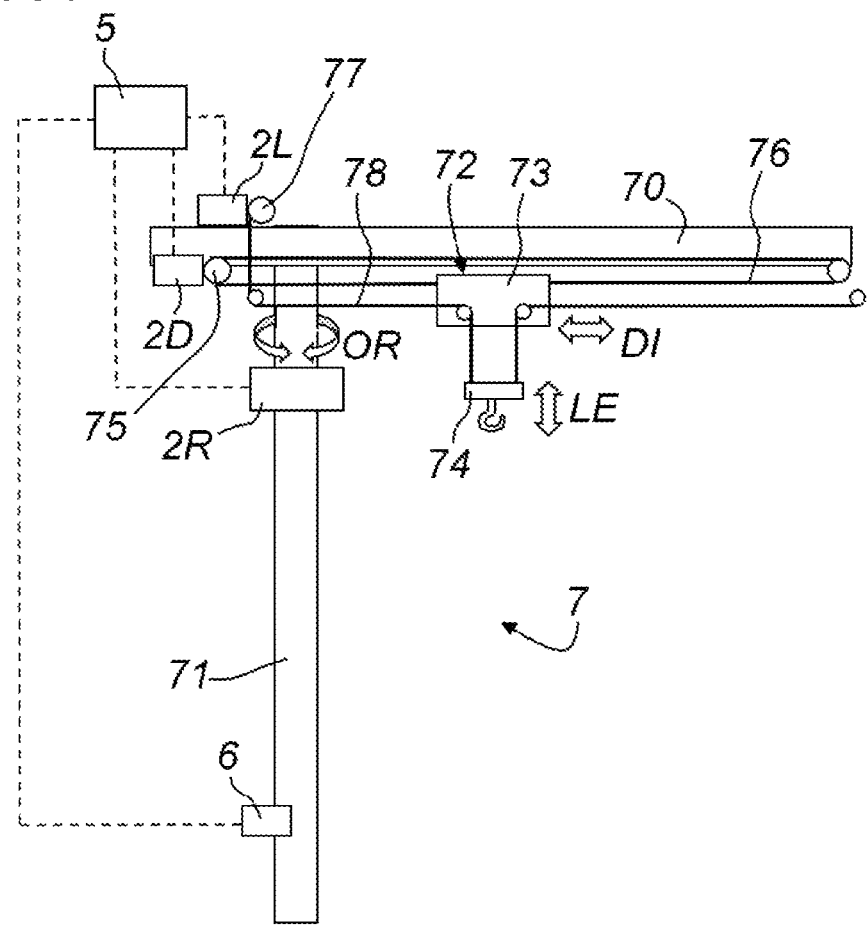

ELECTRIC MOTORIZATION SYSTEM WITH A PREHEATING FUNCTION FOR PROTECTING THE MOTOR THEREOF AGAINST THE CONDENSATION

FIELD

The invention relates to an electric motorization system, as well as a method for protecting against the condensation in an electric motorization system.

It relates more particularly to an electric motorization system, comprising a motor provided with a rotor and stator assembly including several coils, wherein the motor is driven in rotational speed by a frequency converter which is electrically powered by a power supply in order to power the coils with a variable frequency electric current, this frequency converter being controlled by a monitoring/control unit for turning on the motor in a variable speed operating mode, or for turning off the motor.

The electric motorization system and/or the method for protecting against the condensation in an electric motorization system of non-limiting embodiments herein may be applied to a lifting crane. For example, the systems and methods described herein may be implemented in a lifting crane to control one or more operations of the lifting crane.

BACKGROUND

In a lifting crane, the electric motors used for the maneuvers (lifting, orientation, distribution, etc.) are outside and are therefore subjected to climatic variations, which are sunshine, humidity, rain, condensation, wind, snow, frost, etc. Also, the electric motors generally have covers or casings which are more or less protecting them from the climatic environment.

However, it is difficult to fight against the humidity which comes from the condensation of the water contained in the ambient air, and such a humidity has an impact on the mechanical portion of the motor (casing, bearings, magnetic sheet metals, etc.) by oxidation or corrosion, and also on the electrical portion (coils, etc.) by a reduction in insulation.

In order to extend the service life of these motors, it is therefore necessary to remove the humidity present in the motor by condensing the water vapor contained in the air on the surfaces. For this, it is known to heat the motor when the latter is turned off, and as such several solutions are known.

A first solution consists in adding a specific heating resistor on the coils of the motor, and a second solution consists in electrically powering the coils of the motor by means of additional equipment (such as a transformer) which comes in addition to the frequency converter.

These solutions therefore require the addition of components (either inside the motor or outside, at the electrical cabinet for example), which implies an increase in the price of the electric motorization system, a decrease in its reliability and an increased space requirement due to this addition of a component.

SUMMARY

The invention proposes to solve the aforementioned drawbacks by means of a solution allowing heating the motor when the latter is turned off, without adding any additional component, in order to avoid a condensation in the motor.

Another aim of the invention is to propose a preheating function which allows preheating the motor with just the right current and when it is required to avoid any condensation.

Another aim of the invention is to increase the service life of a motor while preserving the quality of the insulators.

Another aim of the invention is to perform the preheating by limiting the temperature rise to just necessary in order not to damage the components and to consume a minimum of energy over the service life of the motor.

Thus, the invention proposes an electric motorization system, comprising a motorized unit equipped with a motor provided with a rotor and stator assembly including several coils, and a frequency converter which is electrically powered by a power supply, this motor being driven in rotational speed by the frequency converter which powers the coils thereof with a variable frequency electric current, this frequency converter being controlled by a monitoring/control unit for turning on the motor in a variable speed operating mode, or for turning off the motor, this electric motorization system being remarkable in that:

it further comprises a measurement system suitable for measuring at least one condensation parameter which is representative of a condensation of the water contained in an ambient air, and the monitoring/control unit is connected to this measurement system and is designed to, depending on said condensation parameter, control the frequency converter during the turning off of the motor so that a preheating electric current flows through the coils to activate a preheating of the motor when it is turned off.

Thus, with the invention, no additional component is used to fulfill the preheating function, the latter being carried out by the monitoring/control unit and by the frequency converter, and this by providing, in the monitoring/control unit, a preheating mode that is triggered when the motor is turned off and depending on the condensation parameter(s) for an optimized triggering.

The measurement system can be placed in an environment which is more or less close to the motor, and for example in a place protected from solar radiation and bad weather such as rain and snow.

It is also understood, within the meaning of the present invention, that the preheating mode, which is activated by the monitoring/control unit when the motor is turned off, certainly leads to a powering of the coils with an electric current, in in this case the preheating electric current, without necessarily turning the motor which remains turned off.

In a first embodiment, the motorized unit may include a motor brake which is configurable between an open configuration during the turning on of the motor to enable a rotation of the motor and a closed configuration blocking the rotation of the motor when the motor is turned off, whether or not the preheating is activated.

Thus, the motor, a candidate for the conditioned preheating function, includes this motor brake which will be open when a motor movement is controlled in the turn-on mode. In the preheating mode, this same motor brake is not controlled, and therefore remains closed, preventing any rotational movement of the motor, even in the presence of the preheating electric current.

It is conceivable that the monitoring/control unit is connected to said motor brake to control the motor brake in the open configuration during the turning on of the motor, and in the closed configuration when the motor is turned off, whether or not the preheating is activated.

In a second embodiment, the motorized unit is devoid of a motor brake.

Such a second embodiment is advantageous with a hydropower plant incorporating a hydraulic pump driven by the motor of the motorized unit.

According to one feature, the preheating electric current is of lower value compared to the variable frequency electric current during the turning on of the motor.

According to one possibility, the measurement system comprises a temperature measuring apparatus suitable for measuring a temperature of the ambient air, said temperature thus constituting a condensation parameter, and the monitoring/control unit is designed to implement the preheating of the motor when the temperature is less than or equal to a dew point temperature.

The dew point temperature is the temperature below which dew is naturally deposited, in other words under which the water (or the water vapor) present in the ambient air is condensed (is liquefied) to form water droplets being deposited on the components of the motor. Thus, the monitoring/control unit automatically triggers the preheating when the ambient temperature reaches or falls below this dew point temperature, thus helping to heat the inside of the motor and therefore to prevent the condensation.

According to another possibility, the measurement system comprises a pressure measuring apparatus suitable for measuring a pressure of the ambient air, said pressure thus constituting a condensation parameter, and the monitoring/control unit is designed to implement the preheating of the motor when the pressure is greater than or equal to a saturated vapor pressure.

Saturated vapor pressure is the pressure above which the water (or the water vapor) present in ambient air is condensed to form water droplets being deposited on the components of the motor. Thus, the monitoring/control unit automatically triggers the preheating when the ambient pressure reaches or rises above this saturated vapor pressure, thus helping to heat the inside of the motor and therefore to prevent the condensation.

According to another possibility, the measurement system comprises a humidity measuring apparatus suitable for measuring a humidity content in the ambient air, said humidity content thus constituting a condensation parameter, and the monitoring/control unit is designed to implement the preheating of the motor when the humidity content is greater than or equal to a predefined threshold.

In a particular embodiment, the monitoring/control unit is designed to stop the preheating of the motor during the turning on of the motor.

Thus, once the motor is turned on, to perform a maneuver (for example a crane maneuver), the preheating is automatically stopped, because the electric current flows through the coils to turn the motor, and therefore necessarily a heating is obtained within the motor.

Advantageously, the monitoring/control unit calculates a value of the preheating electric current depending on the condensation parameter(s) and depending on characteristic parameters of the coils.

In other words, according to the coils (dimensions, materials, number), the monitoring/control unit determines the value of the preheating electric current which will be adapted for a sufficient preheating in order to avoid a condensation.

The invention also relates to a lifting crane comprising at least one electric motorization system according to the invention, the motorized unit of said electric motorization system being connected to at least one movable member of the lifting crane to actuate its displacement and ensure a crane maneuver when the motor is turned on.

In a particular embodiment, the lifting crane comprises several motorized units connected to respective movable members of the lifting crane to actuate their respective displacements and ensure respective crane maneuvers, and in the monitoring/control unit is common to all motorized units.

Thus, the monitoring/control unit can consist of a monitoring/control system common to all these motorized units, but also designed to control all operations of the crane.

The invention also concerns a method for protecting against the condensation in a motor of an electric motorization system, in which the electric motorization system comprises a motorized unit equipped with the motor provided with a rotor and stator assembly including several coils, and a frequency converter which is electrically powered by a power supply, this motor being driven in rotational speed by the frequency converter which powers the coils thereof with a variable frequency electric current, this frequency converter being controlled by a monitoring/control unit for turning on the motor in a variable speed operating mode, or for turning off the motor, this protection method implementing the following steps:

measuring at least one condensation parameter which is representative of a condensation of the water contained in the ambient air;

controlling, by means of the monitoring/control unit, the frequency converter depending on said condensation parameter, during the turning off of the motor, so that a preheating electric current flows through the coils for a preheating of the motor when it is turned off;

In an advantageous application, the protection method is implemented for an electric motorization system of a lifting crane, said electric motorization system being connected to at least one movable member of said lifting crane to actuate its displacement and ensure a crane maneuver when the motor is turned on.

BRIEF DESCRIPTION OF THE DRAWINGS

Other features and advantages of the present invention will appear on reading the detailed description below, of a non-limiting example of implementation, made with reference to the appended figures in which:

FIG. 1 is a schematic view of an electric motorization system according to the invention; and FIG. 2 is a schematic view of a lifting crane according to the invention.

DESCRIPTION

With reference to FIG. 1, an electric motorization system 1 according to the invention comprises a motorized unit 2 equipped with:

a motor 20, of the rotary electric motor type, provided with a rotor and stator assembly including several coils;

a frequency converter 21 which is electrically powered by a power supply 3 in order to power the coils with a variable frequency electric current CE so as to drive the motor 20 in rotational speed.

The motor 20 is coupled at the output to a movable member 4 to effect its displacement; the function of this motor 20 being to displace this movable member 4 at a variable speed.

It should be noted that the power supply 3 can be a mains power supply, or else an autonomous power supply, such as for example a generator or a battery.

The electric motorization system 1 further comprises a monitoring/control unit 5 which controls the frequency converter 21 for:
- turning on the motor 20 in a variable speed operating mode, in order to displace the movable member 4 at variable speed, or
- turning off the motor 20 in order to stop displacing the movable member 4.

This motorized unit 2 further comprises a motor brake 8 configurable between:
- an open configuration when the motor 20 is turned on to enable a rotation of the motor 20, and
- a closed configuration when the motor is turned off to block the rotation of the motor 20.

In a variant which is not illustrated, the motorized unit 2 is devoid of such a motor brake 8. This variant finds a favorite, and non-limiting, application with a hydropower plant incorporating a hydraulic pump driven by the motor 20 of the motorized unit 2.

According to the invention, the electric motorization system 1 comprises a measurement system 6 suitable for measuring at least one condensation parameter T, P, H which is representative of a condensation of the water contained in the ambient air.

This measurement system 6 may comprise at least one of the following measurement apparatuses:
- a temperature measuring apparatus suitable for measuring a temperature T of the ambient air, said temperature T thus constituting a condensation parameter;
- a pressure measuring apparatus suitable for measuring a pressure P of the ambient air, said pressure P thus constituting a condensation parameter;
- a humidity measuring apparatus suitable for measuring a humidity content H in the ambient air, said humidity content H thus constituting a condensation parameter.

All or part of the measuring devices can be positioned, at a greater or shorter distance, from the motor 20, as long as their measurements are representative of the air surrounding the motor 20. In other words, the measurement system 6 can be installed outside the motor 20. It is also possible to have all or part of the measurement apparatuses in the motor 20, and in particular under the casing of the motor 20.

Moreover, in order to fulfill a preheating function when the motor 20 is turned off in order to protect the motor 20 against the condensation, the monitoring/control unit 5 is connected to the measurement system 6 and is designed to, depending on the condensation parameter(s) T, P, H, control the frequency converter 21 during the turning off of the motor 20 so that a preheating electric current CEP flows through the coils for a preheating of the motor 20 when it is turned off.

This preheating electric current CEP is of lower value compared to the variable frequency electric current CE which flows through the coils when the motor 20 is turned on, otherwise during the turning on of the motor 20. Of course, during this preheating in the turn-off mode of the motor 20, the motor brake 8 is always in the closed configuration, such that the motor 20 cannot turn and therefore cannot displace the movable member 4, even though the preheating electric current CEP flows through the coils.

Thus, in the case wherein the temperature T is a condensation parameter, the monitoring/control unit 5 is designed to implement the preheating of the motor 20 when the temperature T is less than or equal to a dew point temperature.

In the case wherein the pressure P is a condensation parameter, the monitoring/control unit 5 is designed to implement the preheating of the motor 20 when the pressure P is greater than or equal to a saturated vapor pressure.

In the case wherein the humidity content H is a condensation parameter, the monitoring/control unit 5 is designed to implement the preheating of the motor 20 when the humidity content H is greater than or equal to a predefined threshold.

Moreover, the monitoring/control unit 5 is designed to automatically stop the preheating of the motor 20 during the turning on of the motor 20, in other words when the motor 20 is turned on in order to displace the movable member 4 at a variable speed.

The invention finds a favorite, and non-limiting, application in a lifting crane 7 shown schematically in FIG. 2, which comprises a distributor boom 70 mounted on a tower 71 (also called a mast); being noted that the invention can be applied with other types of crane such as, for example, self-erecting cranes, unfolding cranes, luffing boom crane, or movable cranes.

The boom 70 can be rotatably mounted on the tower 3 along a vertical axis and this lifting crane 7 can comprise a motorized unit 2R which actuates the displacement of the boom 70 in rotation along this vertical axis and thus effect an orientation maneuver of the boom 70 shown schematically by the arrow OR.

The lifting crane 7 further includes a lifting device 72 for distributing a load (not illustrated) along the boom 70. This lifting device 72 comprises a distributing trolley 73 rolling along the boom 70 and supporting a lifting member 74 provided for hooking the load and may be in the form of a hook.

The lifting crane 7 can thus comprise a 2D motorized unit which actuates the displacement of the lifting device 72, and in particular the displacement of the distributing trolley 73, along the boom 70 and thus ensure a distribution maneuver of the load shown schematically by the arrow DI. This motorized system 2D may have the motor thereof which drives a distribution winch 75 provided with a distribution drum coupled to a distribution cable 76 having strands which are fastened to either side of the distributing trolley 73.

The lifting crane 7 can also comprise a motorized unit 2L which actuates the displacement of the lifting member 74 upward and downward, and thus ensure a lifting maneuver of the load shown schematically by the arrow LE. This motorized system 2L may have the motor thereof which drives a lifting winch 77 provided with a lifting drum coupled to a lifting cable 78 on which the lifting member 74 is suspended.

In an application which is not illustrated, the lifting crane may comprise a hydropower plant incorporating a hydraulic pump driven by a motor of a motorized unit according to the invention, for example to actuate a hydraulic cylinder.

The motorized units 2R, 2D, 2L are all equipped with a motor and a frequency converter, as previously described with reference to FIG. 1. In this lifting crane 7, the monitoring/control unit 5 can be common to all motorized units 2R, 2D, 2L which equip the lifting crane 7.

Likewise, the measurement system 6 can be common to all motorized units 2R, 2D, 2L which equip the lifting crane 7, as illustrated in FIG. 2. This measurement system 6 can for example be located at the foot of the tower 71, and for example under an electrical control cabinet (not illustrated), protected from solar radiation and rain.

The monitoring/control unit 5 is therefore connected to the frequency converters of the motorized units 2R, 2D, 2L, in order to trigger the preheating in all or part of the motorized units 2R, 2D, 2L thereof depending on the condensing parameter(s) T, P, H.

If all motorized units 2R, 2D, 2L are turned off, then the monitoring/control unit 5 triggers the preheating in all motorized units 2R, 2D, 2L. If at least one motorized unit is turned off while at least one other motorized unit is turned on, then the monitoring/control unit 5 triggers the preheating only in the motorized unit(s) which are turned off.

According to an embodiment, the systems and/or methods herein, such as the electric motorization system and/or method for protecting against condensation in the electric motorization system, may be implemented as, include, and/or be performed by one or more computers having a processor and a non-transitory computer-readable storage medium operably connected to the processor. The processor may be a microprocessor. The processor is configured to execute program instructions stored in the computer-readable storage medium to control operations of the crane, or components of the crane, according to the program instructions. In this manner, the methods, steps, operations, processes and the like of the electric motorization system may be performed by way of one or more computers.

The invention claimed is:

1. An electric motorization system comprising:
    a motorized unit equipped with a motor provided with a rotor and stator assembly including several coils, and a frequency converter electrically powered by a power supply, the motor driven in rotational speed by the frequency converter which powers the coils of the motor with a variable frequency electric current;
    a monitoring/control unit configured to control the frequency converter for turning on the motor in a variable speed operating mode, or for turning off the motor; and
    a measurement system configured to measure at least one condensation parameter representative of a condensation of water contained in an ambient air,
    wherein the monitoring/control unit is connected to the measurement system and is configured to, depending on the condensation parameter, control the frequency converter during the turning off of the motor so that a preheating electric current flows through the coils to activate a preheating of the motor when the motor is turned off, and
    wherein the motorized unit comprises a motor brake configurable between an open configuration during the turning on of the motor to enable a rotation of the motor and a closed configuration blocking the rotation of the motor when the motor is turned off, whether or not the preheating is activated.

2. The electric motorization system according to claim 1, wherein the preheating electric current is of lower value compared to the variable frequency electric current during the turning on of the motor.

3. The electric motorization system according to claim 1, wherein the measurement system comprises a temperature measuring apparatus configured to measure a temperature of the ambient air, wherein the at least one condensation parameter includes the temperature, and the monitoring/control unit is configured to implement the preheating of the motor when the temperature is less than or equal to a dew point temperature.

4. The electric motorization system according to claim 1, wherein the measurement system comprises a pressure measuring apparatus configured to measure a pressure of the ambient air, wherein the at least one condensation parameter includes the pressure, and the monitoring/control unit is configured to implement the preheating of the motor when the pressure is greater than or equal to a saturated vapor pressure.

5. The electric motorization system according to claim 1, wherein the measurement system comprises a humidity measuring apparatus configured to measure a humidity content in the ambient air, wherein the at least one condensation parameter includes the humidity content, and the monitoring/control unit is configured to implement the preheating of the motor when the humidity content is greater than or equal to a predefined threshold.

6. The electric motorization system according to claim 1, wherein the monitoring/control unit is configured to stop the preheating of the motor during the turning on of the motor.

7. The electric motorization system according to claim 1, wherein the monitoring/control unit calculates a value of the preheating electric current depending on the at least one condensation parameter and depending on characteristic parameters of the coils.

8. A lifting crane comprising:
    at least one electric motorization system according to claim 1; and
    at least one movable member,
    wherein the motorized unit of the electric motorization system is connected to the at least one movable member of the lifting crane to actuate displacement of the at least one movable member and to effect a crane maneuver when the motor is turned on.

9. The lifting crane according to claim 8, comprising several motorized units connected to respective movable members to actuate respective displacements of the movable members and to effect respective crane maneuvers, wherein the monitoring/control unit is common to all motorized units.

10. A method for protecting against the condensation in a motor of an electric motorization system, wherein the electric motorization system comprises:
    a motorized unit equipped with the motor, the motor provided with a rotor and stator assembly including several coils, and a frequency converter which is electrically powered by a power supply, the motor driven in rotational speed by the frequency converter which powers the coils of the motor with a variable frequency electric current; and
    a monitoring/control unit configured to control the frequency converter for turning on the motor in a variable speed operating mode, or for turning off the motor,
    wherein the motorized unit comprises a motor brake which is connected to the monitoring/control unit and configurable between an open configuration during the turning on of the motor to enable a rotation of the motor and a closed configuration blocking the rotation of the motor when the motor is turned off, the method comprising:
    measuring at least one condensation parameter representative of a condensation of the water contained in ambient air;
    controlling, by the monitoring/control unit, the frequency converter depending on the at least one condensation parameter, during the turning off of the motor, so that a preheating electric current flows through the coils for a preheating of the motor when the motor is turned off; and
    controlling, by the monitoring/control unit, the motor brake in the open configuration during the turning on of the motor, and in the closed configuration when the motor is turned off, whether or not the preheating is activated.

11. The protection method according to claim 10, wherein the protection method is implemented for an electric motorization system of a lifting crane, the electric motorization system connected to at least one movable member of the lifting crane to actuate displacement of the movable member and to effect a crane maneuver when the motor is turned on.

12. An electric motorization system comprising:
- a motorized unit equipped with a motor provided with a rotor and stator assembly including several coils, and a frequency converter electrically powered by a power supply, the motor driven in rotational speed by the frequency converter which powers the coils of the motor with a variable frequency electric current;
- a monitoring/control unit configured to control the frequency converter for turning on the motor in a variable speed operating mode, or for turning off the motor; and
- a measurement system configured to measure at least one condensation parameter representative of a condensation of water contained in an ambient air, wherein the monitoring/control unit is connected to the measurement system and is configured to, depending on the condensation parameter, control the frequency converter during the turning off of the motor so that a preheating electric current flows through the coils to activate a preheating of the motor when the motor is turned off, and wherein the motorized unit comprises a motor brake configurable between an open configuration during the turning on of the motor to enable a rotation of the motor and a closed configuration mechanically blocking the rotation of the motor when the motor is turned off, whether or not the preheating is activated.

* * * * *